July 25, 1967

E. ALLGAIER ET AL 3,332,299

DRIVE PARTICULARLY FOR SMALL TRACTORS WITH
HIGH-SPEED DRIVING MOTORS

Filed Jan. 26, 1965

INVENTORS
ERWIN ALLGAIER
KASPAR RITTER

BY

ATTORNEY.

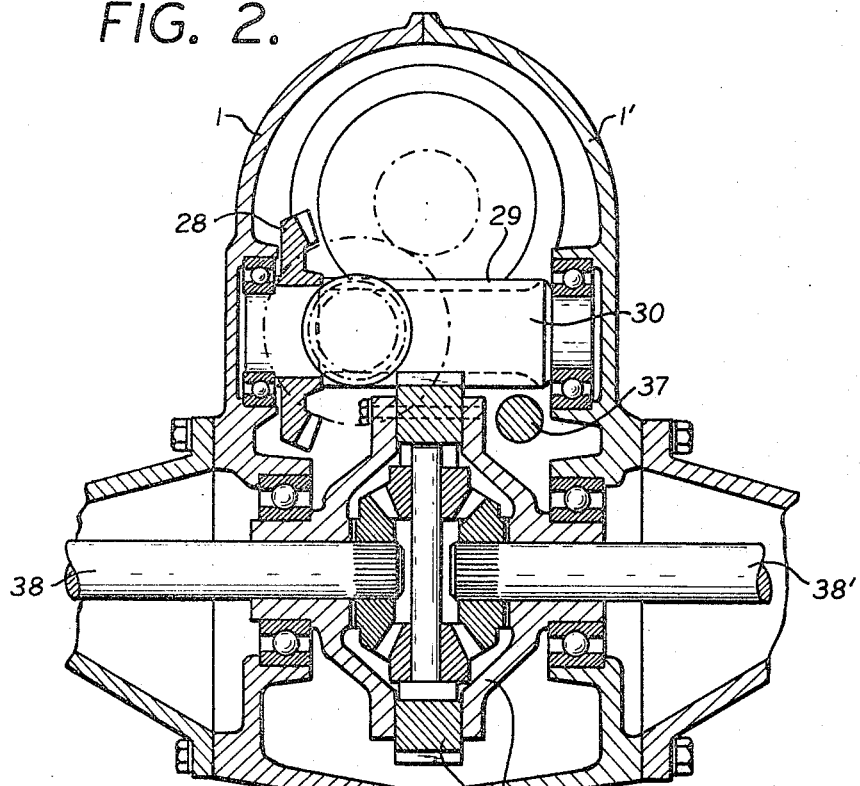
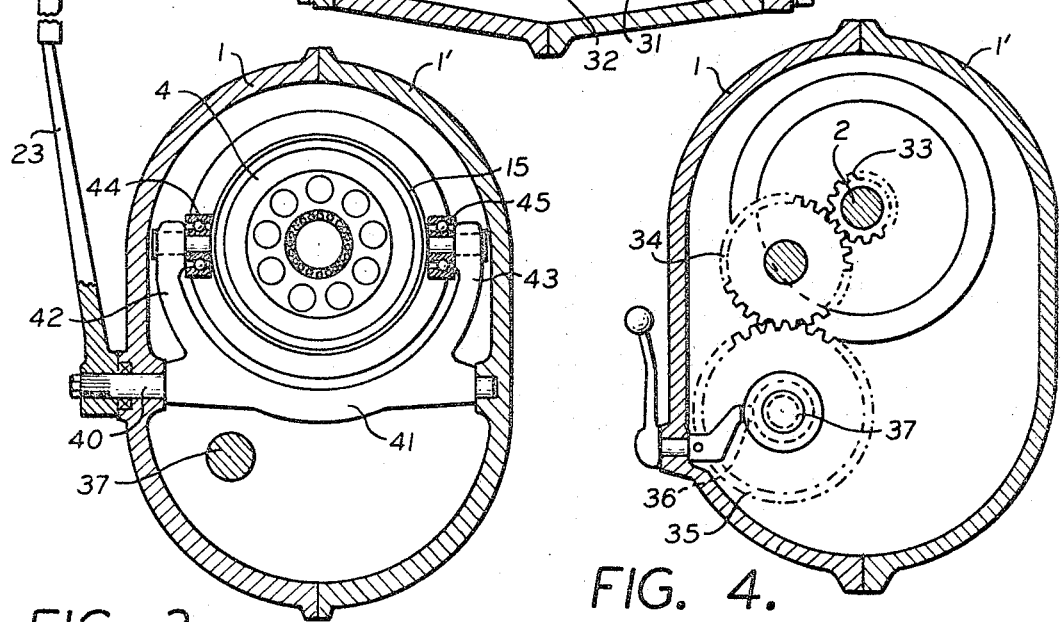
FIG. 2.
FIG. 3.
FIG. 4.
INVENTORS
ERWIN ALLGAIER
KASPAR RITTER
BY
ATTORNEY.

United States Patent Office 3,332,299
Patented July 25, 1967

3,332,299
DRIVE PARTICULARLY FOR SMALL TRACTORS WITH HIGH-SPEED DRIVING MOTORS
Erwin Allgaier, Boll, Kreis Goppingen, and Kaspar Ritter, Kirchheim, Teck, Germany, assignors to Kopat Gesellschaft fuer Konstruktion, Entwicklung und Patentverwertung m.b.H., Boll, Kreis Goppingen, Germany
Filed Jan. 26, 1965, Ser. No. 428,179
Claims priority, application Germany, Apr. 18, 1964, K 52,733
4 Claims. (Cl. 74—665)

The present invention relates to a drive, particularly for small tractors with high-speed driving engines.

Such drives must have a reduction gear ratio of about 1:40 to 1:50 due to the comparatively high number of revolutions of the driving engines in form of mostly one-cylinder combustion engines having about 3000 to 4000 revolutions/min. with a simultaneously about 10 km./hour limited highest running speed. Due to the comparatively low torque and the low elasticity of the driving engines, the drives should make possible simultaneously a finest possible continuous adjustment of the output torque effective upon the tractor wheels to the prevailing pulling for the requirement. A gradual change speed gear drive has been used already for the described purpose, in which up to six different gears for forward and reverse run are provided. Such drives permit in spite of the appreciable technical expensiveness a gear shift only by simultaneous interruption of the drive by discoupling, in case of lack of a synchronization device, practically only during the standstill of the vehicle.

For farm tractors drives having a power take-off shaft are known, which drives comprises a hydrostatic transmission operating as a torque converter and driven by the engine shaft, and a multi-step mechanical reduction gear following the torque converter. In these drives only a total reduction gear ratio of about 1:25 is required between the engine shaft and the wheel driving shaft, due to the lower number of revolutions of the engines for the farm tractors at simultaneously greater top speeds.

It is the main object of the present invention to provide a drive particularly for small tractors with high-speed driving engines which avoids the drawbacks inherent in the known structures set forth above.

It is another object of the present invention to provide a drive, particularly for small tractors with high-speed driving engines, wherein the known use of a hydrostatic drive as a continuously controllable torque converter with following mechanical reduction gear is applied such, that the following gear drive has only a reduction gear ratio of about 1:20 and 1:25, while the further reduction of the number of revolutions is brought about at a ratio of about 1:2 also in the main running range by the hydrostatic torque converter. In this manner, it has been brought about to cut into about half the required mechanical reduction gear ratio and thereby to improve its mechanical efficiency with simultaneous elimination of a reduction gear step, by exploitation of an at least approximately constant favorable mechanical efficiency of a hydrostatic drive in a comparatively wide range of ratios between about 1:1.5 and 1:0.25, having an inner power division and symmetrical arrangement of the pump portion and of the motor portion.

It is still another object of the present invention to provide a drive, particularly for small tractors with high-speed driving engines, wherein the drive equipped with a power take-off shaft is chosen such, that the median step of the mechanical reduction gear drive, containing totally three steps, is formed by a continuous speed cone drive consisting of a pinion and a crown wheel and laterally set off relative to a vertical center plane, and power take-off shaft is disposed on the side opposite of the continuous speed cone drive. This structure makes it possible to mount the total drive in a particularly small housing, as it is urgently desirable for a small tractor with its small dimensions, only already for reasons of improving the viewing visibility.

It is yet another object of the present invention to provide a drive, particularly for small tractors with high-speed engines, wherein a further reduction of the dimensions of the drive housing also in direction of height is brought about such that the last step of the mechanical reduction gear drive is formed as a spur gear wheel transmission with axes disposed at least approximately vertically relative to each other and the power take-off shaft runs between the two axes.

Under certain circumstances an additional gear step can be disposed between the engine output and the input shaft of the hydrostatic torque converter, in order to adjust the drive to engines with differently rated numbers of revolutions.

With these and other objects in view which will become apparent in the following detailed description, the present invention will be clearly understood in connection with the accompanying drawings, in which:

FIG. 2 is a section along the lines 2—2 of FIG. 1;

FIG. 3 is a section along the lines 3—3 of FIG. 1;

FIG. 4 is a section along the lines 4—4 of FIG. 1; and

Figure 5:
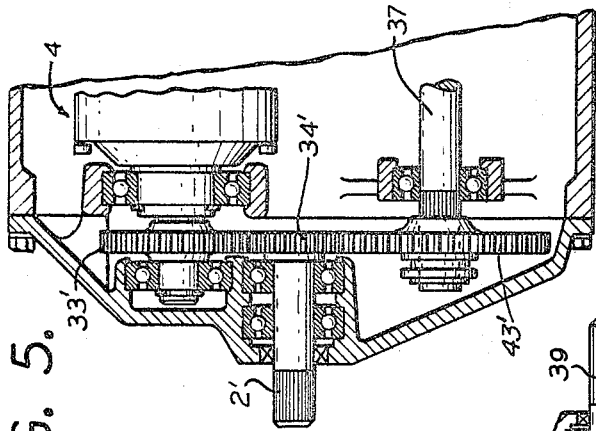
FIG. 5 is a fragmentary section of the driving side of a slightly varied embodiment of the drive similar to that shown in FIG. 1.

Referring now to the drawings and in particular to FIGS. 1 to 4, the drive, being disposed in a longitudinally divided housing 1 and 1', comprises a hydrostatic converter 4 connectable with its input shaft 2 with a high-speed driving combustion engine (not shown), and a three-stepped mechanical reduction gear drive 5, which follows the hydrostatic converter 4. The hydrostatic torque converter 4 comprises an axial piston pump 6 and a symmetrically designed axial piston motor 7, which pump 6 and motor 7 are disposed within a common rotating housing 8 with angularly movable swinging bodies 9 and 10, respectively, mounted therein, and a control disc 11 arranged such, that the piston drum 12 of the pump 6 is coupled for joint rotation with the input shaft 2, while the piston drum 13 of the motor 7 is supported nonrotatably by means of a holding shaft 14 secured to the housing 1. A control-cylinder 15 is guided for longitudinal movement in the direction of the double arrow 16 on the rotary housing 8, which control-cylinder 15 is equipped with control slots 17 and 18. Ball pins 19 and 20 of the arms 21 and 22 rigidly secured to the swinging bodies 9 and 10 penetrate into the control slots 17 and 18, such that the angular adjustment of the swinging bodies 9 and 10, respectively, can be continuously varied independently from the rotation of the rotary housing 8 by longitudinal movements of the control-cylinder 15 by means of a control lever 23. By this arrangement the transmission ratio can be likewise continuously varied in the torque converter between the transmission ratio 1:∞ corresponding with the traveling speed O and the greatest forward speed and back-up speed, respectively. At the right end of the rotary housing 8 is mounted for joint rotation a working-pinion 24, which constitutes jointly with a spur gear 26, disposed on an intermediate shaft 25 arranged in longitudinal direction of the drive, the first mechanical reduction gear step. The second reduction gear step comprises a conical pinion 27 secured to the intermediate shaft 25 and a crown wheel 28, which is disposed jointly with a further spur pinion 29 on a second intermediate shaft 30, arranged crosswise in the housing. The spur pinion 29 meshes with a spur gear 32, disposed on the outside of a differential housing 31, which gears constitute jointly the third mechanical reduction gear step of the drive. The crown wheel 28 is, as clearly shown in FIG. 2, partly set off from the vertical center plane of the driving housing, so that space is provided on the other side of the center plane for an output shaft 37 driven from the input shaft 2 over a spur gear drive 33, 34 and 35 and a coupling 36. The power takeoff shaft 37 runs at a level between the rear axles 38 and 38' and the intermediate shaft 30, which is disposed at least approximately vertically above the rear axles 38 and 38', whereby a very low construction height of the driving housing with a suitable height position of the free connection of the output shaft 39 results.

Figure 1:
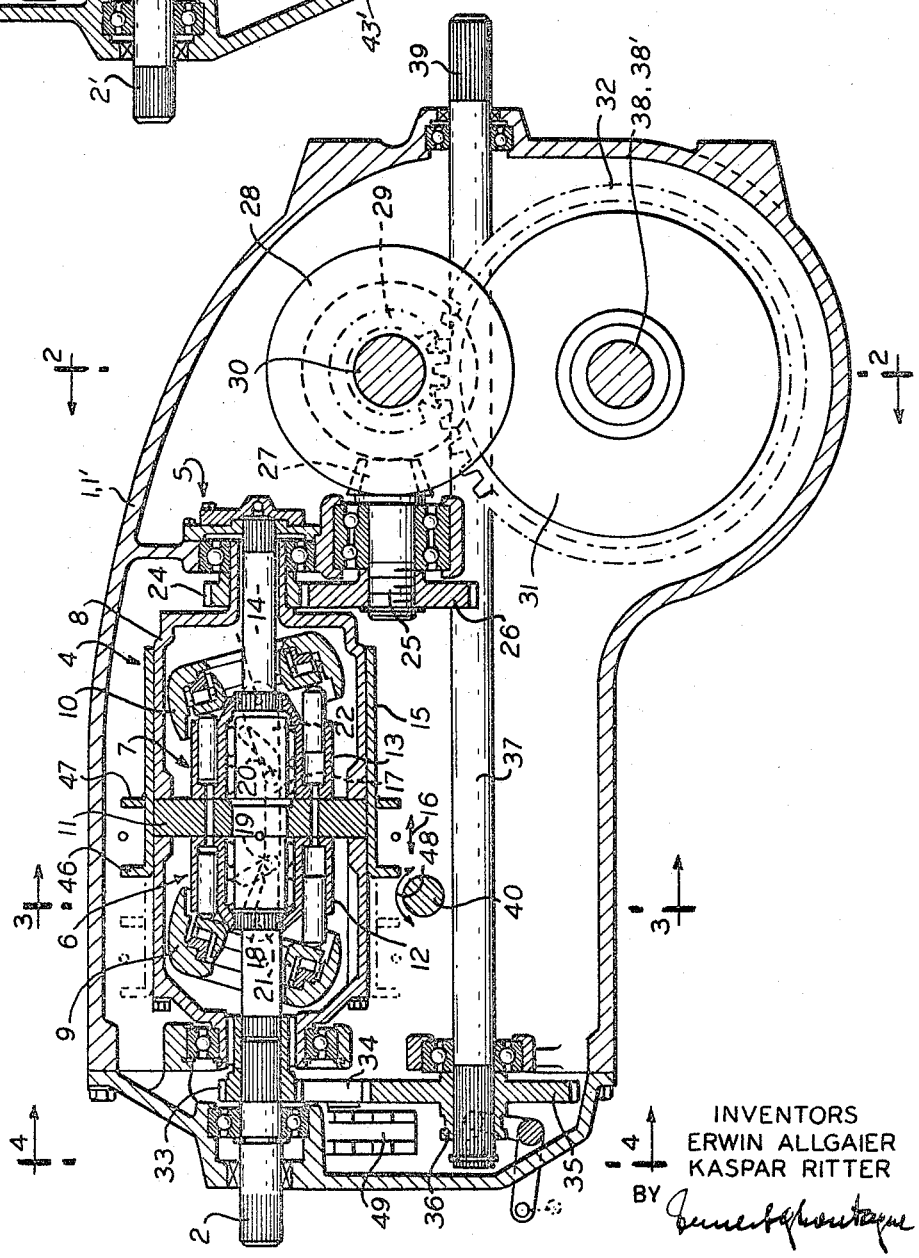
FIGURE 1 is a longitudinal section of a drive for a small tractor.

The connection between the control-cylinder 15 and the control lever 23 disposed outside of the drive housing 1 and 1' for the speed control, which takes place by means of a cross-shaft 40 and fork 41 with the arms 42 and 43, can be best recognized in the section shown in FIG. 3 as a section of the lines 3—3 of FIG. 1. The arms 42 and 43 of the fork 41 gripping over the torque converter 4 carry at their ends rollers 44 and 45, which engage the control-cylinder 15 between flanges 46 and 47, and cause thereby during each swinging movement of the shaft 40 with the fork 41 in one or the other direction of the double arrow 48, a longitudinal movement of the control cylinder 15 in one or the other direction of the double arrow 16. The section, disclosed in FIG. 4 is a section along the lines 4—4 of the drive of FIG. 1, shows the mechanical power take-off for the power take-off shaft 37 originating from the input shaft 2 and consisting of three spur gear wheels 33, 34 and 35. The intermediate gear 34 provided for bridging over the distance between the torque converter and the power take-off shaft of this spur gear train, serves simultaneously the drive of a filling pump 49, which feeds continuously so much working fluid with a slight overpressure into the inner cycle of the hydrostatic torque converter 4, as is required for supply of sealing losses and for lubrication. A coupling 36 is provided for the selective connection and disconnection, respectively, of the power output shaft 37 within the drive, which coupling 36 is designed as indicated in FIG. 1, as a sliding gear, as a claw-coupling or a friction-coupling shiftable selectively under the load.

Referring now again to the drawings and particularly to FIG. 5, an embodiment of the driving side of the drive is disclosed in which the input shaft 2' is directly connected with the intermediate gear 34' of a mechanical spur gear drive, while the pump 6 of the hydrostatic converter 4 is driven by means of a gear drive 43', 33', which permits a change of the input number of revolutions of the torque converter relative to the driving engine.

While we have disclosed several embodiments of the present invention, it is to be understood that these embodiments are given by example only and not in a limiting sense, the scope of the present invention being determined by the objects and the claims.

We claim:
1. A drive, particularly for small tractors with a high-speed driving engine, comprising
   a continuously controllable hydrostatic torque converter having an input and an output end, and including a pump portion and a motor portion,
   an engine operatively connected with said input end of said torque converter,
   a multi-step gear drive operatively connected with said output end of said torque converter for the adjustment to the number of revolutions of a drive shaft,
   the ratio of the number of revolutions between said input end and said drive shaft being about 1:40 to 1:50,
   said multi-step gear drive having a reduction gear ratio of about 1:20 to 1:25, said hydrostatic torque converter having an additional reduction of the number of revolutions at a ratio of about 1:2, and
   said hydrostatic torque converter having an inner power division and symmetrical arrangement of said pump portion and of said motor portion.
2. The drive, as set forth in claim 1, wherein
   said multi-step gear drive comprises three steps,
   the median of said three step of said gear drive comprises a continuous speed cone drive consisting of a pinion and a crown wheel laterally set off from a vertical center plane, and
   a power take-off shaft is disposed on the opposite side from said vertical center plane opposite said continuous speed cone.
3. The drive, as set forth in claim 2, wherein
   the last of said three steps of said gear drive comprises a spur gear transmission including horizontal shafts disposed at least approximately vertically above each other, and
   said power take-off shaft is disposed between said shafts.
4. The drive, as set forth in claim 1, which includes
   a reduction gear step preceding said torque converter.

References Cited

UNITED STATES PATENTS 2,945,382  7/1960  Ritter et al. _____ 74—15.63 X
3,119,478  1/1964  Ritter _____ 74—15.84
3,204,468  9/1965  Ruoff _____ 74—15.63 X FRED C. MATTERN, JR., *Primary Examiner.*

DAVID J. WILLIAMOWSKY, *Examiner.*

C. J. HUSAR, *Assistant Examiner.*